(12) United States Patent
Huang et al.

(10) Patent No.: US 10,212,291 B2
(45) Date of Patent: Feb. 19, 2019

(54) SYSTEM, METHOD, AND NON-TRANSITORY COMPUTER READABLE STORAGE MEDIUM FOR IMAGE RECOGNITION BASED ON CONVOLUTIONAL NEURAL NETWORKS

(71) Applicant: INSTITUTE FOR INFORMATION INDUSTRY, Taipei (TW)

(72) Inventors: Yao-Min Huang, Taipei (TW);
Wen-Shan Liou, New Taipei (TW);
Hsin-I Lai, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 0 days.

(21) Appl. No.: 15/673,407

(22) Filed: Aug. 9, 2017

(65) Prior Publication Data
US 2018/0359378 A1    Dec. 13, 2018

(30) Foreign Application Priority Data

Jun. 8, 2017   (TW) ............................. 106119094 A

(51) Int. Cl.
H04N 5/228    (2006.01)
H04N 1/00     (2006.01)
G06K 9/46     (2006.01)

(52) U.S. Cl.
CPC ........... *H04N 1/00244* (2013.01); *G06K 9/46* (2013.01); *H04N 1/00209* (2013.01); *H04N 2201/0084* (2013.01)

(58) Field of Classification Search
CPC ................................ H04N 1/00244
USPC ..................................................... 348/222.1
See application file for complete search history.

(56) References Cited

U.S. PATENT DOCUMENTS

2010/0223219 A1* 9/2010 Kato .................... G06N 3/08
                                                                706/27

FOREIGN PATENT DOCUMENTS

CN           205621018 U   * 10/2016

OTHER PUBLICATIONS

The office action of the corresponding Taiwanese application dated Dec. 27, 2017.

* cited by examiner

*Primary Examiner* — Usman A Khan
(74) *Attorney, Agent, or Firm* — CKC & Partners Co., Ltd.

(57) ABSTRACT

A recognition system includes an image capturing device and a server. The image capturing device generates a Mth-layer calculation result based on image data and a convolutional neural network (CNN), and transmits feature information associated with the Mth-layer calculation result. M is a positive integer, M is equal to or greater than 1, M is less than or equal to N, and N is a predetermined positive integer. The server receives the feature information. The server generates a Kth-layer calculation result based on the feature information and the CNN by an iterative method when M is less than N. K is a positive integer which is greater than M and less than or equal to N. The server generates a first recognition result associated with the image data based on the Kth-layer calculation result and a first recognition model when K is equal to N.

11 Claims, 4 Drawing Sheets

SYSTEM, METHOD, AND NON-TRANSITORY COMPUTER READABLE STORAGE MEDIUM FOR IMAGE RECOGNITION BASED ON CONVOLUTIONAL NEURAL NETWORKS

RELATED APPLICATIONS

This application claims priority to Taiwanese Application Serial Number 106119094, filed Jun. 8, 2017, which is herein incorporated by reference.

BACKGROUND

Technical Field

The present disclosure relates to a recognition technology. More particularly, the present disclosure relates to a recognition system, and recognition method, and a non-transitory computer readable storage medium.

Description of Related Art

With the development of image technology, various image processes (for example, object detection) have been developed. In current technology, image data is transmitted from a camera to a server for following processes or recognitions. During a transmission of the image data, the image data may be leaked out.

SUMMARY

One embodiment of the present disclosure is related to a recognition system. The recognition system includes an image capturing device and a server. The server is coupled to the image capturing device. The image capturing device is configured to generate a Mth-layer calculation result based on image data and a convolutional neural network (CNN), and configured to transmits feature information associated with the Mth-layer calculation result. M is a positive integer, M is equal to or greater than 1, M is less than or equal to N, and N is a predetermined positive integer. The server is configured to receive the feature information. The server generates a Kth-layer calculation result based on the feature information and the CNN by an iterative method when M is less than N. K is a positive integer which is greater than M and less than or equal to N. The server generates a first recognition result associated with the image data based on the Kth-layer calculation result and a first recognition model when K is equal to N, in order to recognize the image data.

Another embodiment of the present disclosure is related to a recognition method. The recognition method includes: by an image capturing device, generating a Mth-layer calculation result based on image data and a convolutional neural network (CNN); by the image capturing device, transmitting feature information associated with the Mth-layer calculation result to a server, wherein M is a positive integer, M is equal to or greater than 1, M is less than or equal to N, and N is a predetermined positive integer; by the server, generating a Kth-layer calculation result based on the feature information and the CNN by an iterative method when M is less than N, wherein K is a positive integer which is greater than M and less than or equal to N; and by the server, generating a first recognition result associated with the image data based on the Kth-layer calculation result and a first recognition model when K is equal to N, in order to recognize the image data.

Yet another embodiment of the present disclosure is related to a non-transitory computer readable storage medium storing a computer program. The computer program is configured to execute a recognition method. The recognition method includes: generating a Mth-layer calculation result based on image data and a convolutional neural network (CNN); transmitting feature information associated with the Mth-layer calculation result, wherein M is a positive integer, M is equal to or greater than 1, M is less than or equal to N, and N is a predetermined positive integer; generating a Kth-layer calculation result based on the feature information and the CNN by an iterative method when M is less than N, wherein K is a positive integer which is greater than M and less than or equal to N; and generating a first recognition result associated with the image data based on the Kth-layer calculation result and a first recognition model when K is equal to N, in order to recognize the image data.

As the above embodiments, in the recognition system and the recognition method of the present disclosure, the image capturing device transmits the feature information instead of the image data to the server. Thus, the image data is prevented from being leaked out during a transmission.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows:

FIG. 4 is a schematic diagram illustrating a pooling algorithm according to some embodiments of the present disclosure.

DETAILED DESCRIPTION

Figure 1:
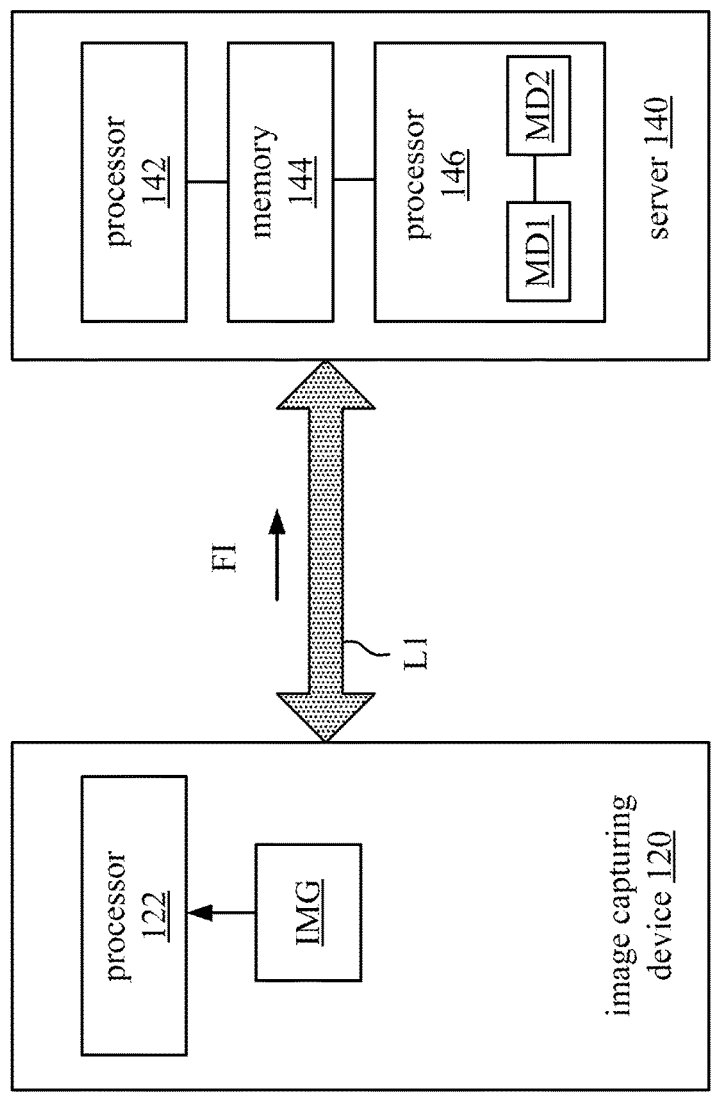
FIG. 1 is a schematic diagram illustrating a recognition system according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts. The embodiments below are described in detail with the accompanying drawings, but the examples provided are not intended to limit the scope of the disclosure covered by the description. The structure and operation are not intended to limit the execution order. Any structure regrouped by elements, which has an equal effect, is covered by the scope of the present disclosure.

Moreover, the drawings are for the purpose of illustration only, and are not in accordance with the size of the original drawing. The components in description are described with the same number to understand.

The terms "comprises", "comprising", "includes", "including", "has", "having" . . . etc. used in this specification are open-ended and their meaning are "comprises but not limited".

As used herein, "coupled" may refer to two or more elements are in "direct" physical or electrical contact made, or "indirectly", as a mutual entity or electrical contact, and may also refer to two or more elements are operating or action.

Reference is now made to FIG. 1. FIG. 1 is a schematic diagram illustrating a recognition system 100 according to some embodiments of the present disclosure. As illustratively shown in FIG. 1, the recognition system 100 includes an image capturing device 120 and a server 140.

In some embodiments, the image capturing device 120 is an internet protocol (IP) camera, a digital camera, a smart phone, a tablet, a notebook, a smart appliance, or various devices with an image capturing function. In some embodiments, the server 140 is a cloud server or a local server.

In some embodiments, the image capturing device 120 is coupled to the server 140. In some embodiments, the image capturing device 120 establishes, through a transmission module (not shown) of the image capturing device 120, a communication link L1 with the server 140. Thus, the image capturing device 120 and the server 140 are able to exchange data through the communication link L1. For example, the image capturing device 120 transmits feature information FI associated with image data IMG to the server 140 through the communication link L1. In some embodiments, the communication link L1 includes a wire communication link or a wireless communication link.

In some embodiments, the image capturing device 120 includes a processor 122. In some embodiments, the processor 122 is a central processor unit (CPU), a micro-processor, a processing circuit, or various hardware elements which are able to execute commands.

In some embodiments, the server 140 includes a processor 142, a memory 144, and a processor 146. The memory 144 is coupled to the processor 142 and the processor 146. In some embodiments, each of the processor 142 and the processor 146 is a CPU, a micro-processor, a processing circuit, or various hardware elements which are able to execute commands. In some other embodiments, the processor 142 and the processor 146 form a CPU, a micro-processor, a processing circuit, or various hardware elements which are able to execute commands. In some embodiments, the memory 144 is a ROM, a flash memory, a floppy disk, a hard disk, an optical disk, a USB, a magnetic tape, or various hardware elements which are able to store data.

In some embodiments, the processor 146 includes or executes at least one recognition model. As illustratively shown in FIG. 1, the processor 146 includes or executes a recognition model MD1 and a recognition model MD2. In some embodiments, the recognition model MD1 or the recognition model MD2 is a neural network model. In some embodiments, the recognition model MD1 is different from the recognition model MD2. For example, the recognition model MD1 has an image classification function, and the recognition model MD2 has an object detection function.

In some embodiments, the recognition model MD1 or the recognition model MD2 is implemented with software, hardware and/or firmware. Various implementations of the recognition model MD1 or the recognition model MD2 are within the contemplated scope of the present disclosure.

Figure 2:
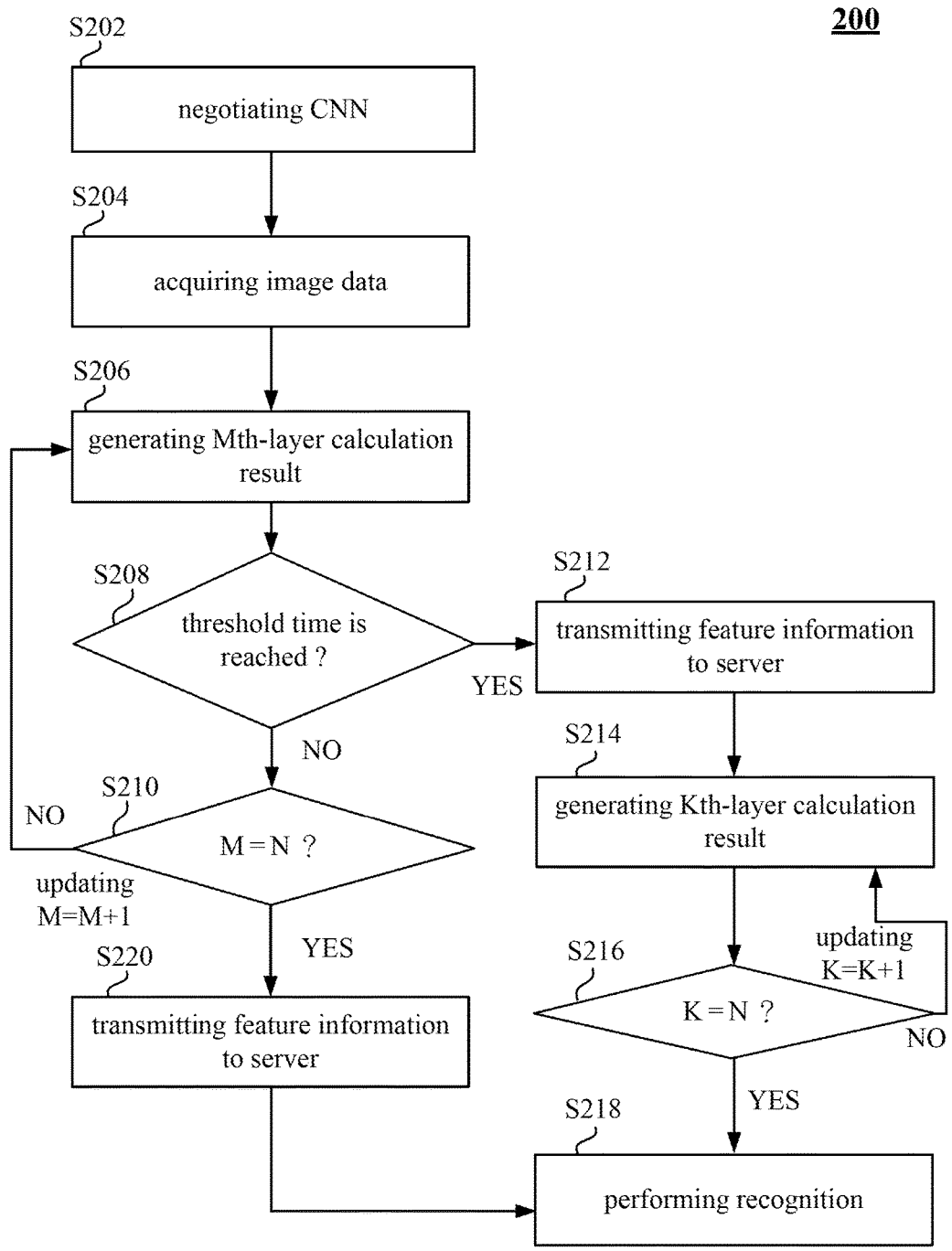
FIG. 2 is a flow diagram illustrating a recognition method according to some embodiments of the present disclosure.
Figure 3:
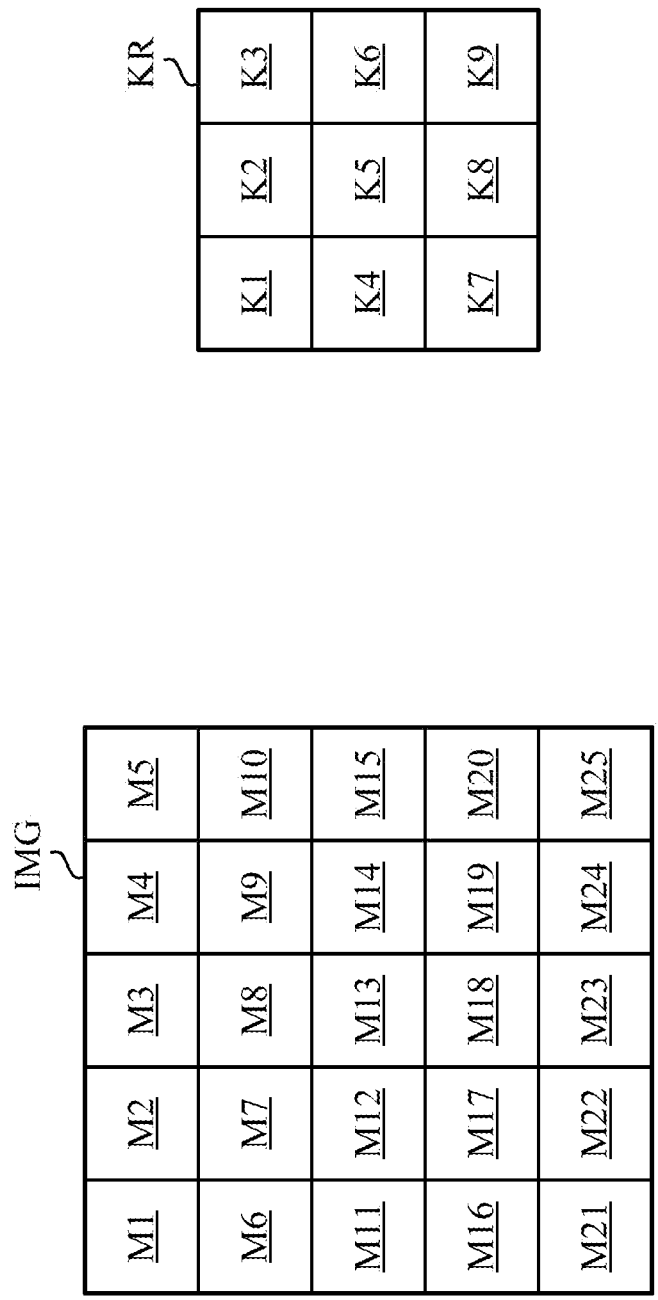
FIG. 3 is a schematic diagram illustrating a convolution algorithm according to some embodiments of the present disclosure.

Reference is now made to FIG. 2 and FIG. 3. FIG. 2 is a flow diagram illustrating a recognition method 200 according to some embodiments of the present disclosure. FIG. 3 is a schematic diagram illustrating a convolution algorithm according to some embodiments of the present disclosure. In some embodiments, the recognition method 200 is applied to the recognition system 100 in FIG. 1. The recognition method 200 includes step S202, step S204, step S206, step S208, step S210, step S212, step S214, step S216, step S218, and step S220. For better understanding of the present disclosure, the recognition method 200 is discussed in relation to FIG. 1 and FIG. 3, but the present disclosure is not limited thereto.

In step S202, the image capturing device 120 negotiates a convolutional neural network (CNN) with the server 140. In some embodiments, the image capturing device 120 includes one or more CNNs. In some embodiments, the server 140 includes one or more CNNs. In some embodiments, the image capturing device 120 transmits model identification (model ID) information to the server 140, such that the image capturing device 120 and the server 140 adopt the same CNN. In some embodiments, the model ID information is configured to bind various network parameters. In some embodiments, the CNN includes a convolution algorithm, a pooling algorithm, an activation algorithm, or a deconvolution algorithm.

In step S204, the image capturing device 120 acquires the image data IMG. In some embodiments, the image capturing device 120 captures an original image. The original image is processed by a pre-process to generate the image data IMG. For example, the original image is processed by a pixel reducing process to generate the image data IMG. Thus, the number of pixels of the image data IMG is less than the number of pixels of the original image. In some other embodiments, the image data IMG is the original image without being processed by the pre-process.

As illustratively shown in FIG. 3, the image data IMG includes twenty five pixels. The pixels include pixel values M1-M25. The number of the pixels of the image data IMG is given for illustrative purposes only. Various numbers of the pixels of the image data IMG are within the contemplated scope of the present disclosure.

In step S206, the processor 122 performs an algorithm of the CNN. The algorithm is, for example, the convolution algorithm. In some embodiments, the processor 122 utilizes one or more feature cores (for example, a feature core KR in FIG. 3) to perform the convolution algorithm to the image data IMG, in order to generate a 1st-layer calculation result. In some embodiments, each CNN is corresponding to one or more feature cores. One of the feature cores includes a plurality of content values. As illustratively shown in FIG. 3, the feature core KR includes nine content values. The content values include content values K1-K9. The number of the content values of the feature core KR is given for illustrative purposes only. Various numbers of the content values of the feature core KR are within the contemplated scope of the present disclosure.

The convolution algorithm is described in following paragraphs. At first, the content values K1-K9 of the feature core KR sequentially correspond to the pixel values M1, M2, M3, M6, M7, M8, M11, M12, and M13 of the image data IMG. By the convolution algorithm, a first simplified value is obtained. For example, the content values K1-K9 are 1, 0, 1, 0, 2, 3, 1, 1, and 0 respectively, and the pixel values M1, M2, M3, M6, M7, M8, M11, M12 and M13 are 2, 3, 0, 1, 2, 0, 0, 1, and 2 respectively. The calculation result of the convolution algorithm is 7 (1*2+0*3+1*0+01+2*2+3*0+1*0+11+0*2=7). In other words, the first simplified value is 7. Then, the feature core KR is entirely moved rightwards by one grid, such that the content values K1-K9 sequentially correspond to the pixel values M2, M3, M4, M7, M8, M9, M12, M13, and M14 of the image data IMG. By the convolution algorithm, a second simplified value is obtained. Then, the feature core KR is entirely moved rightwards by one grid, such that the content values K1-K9 sequentially correspond to the pixel values M3, M4, M5, M8, M9, M10, M13, M14, and M15 of the image data IMG. By the convolution algorithm, a third simplified value is obtained. Then, the feature core KR is entirely moved downwards by one grid and moved to the leftmost, such that the content values K1-K9 sequentially correspond to the pixel values M6, M7, M8, M11, M12, M13, M16, M17, and M18 of the image data IMG. By the convolution algorithm, a fourth simplified value is obtained. Remaining simplified values are obtained by an analogous manner. Accordingly, nine simplified values may be finally obtained. In some embodiments, nine simplified values may be sequentially arranged as a square matrix (for example, a convolution result), a shape of the square matrix is a nine-square-grid, and the convolution result is a Mth-layer calculation result. In some embodiments, M is a positive integer, M is less than or equal to N. In some embodiments, N is a predetermined positive integer. For example, the convolution result is regarded as a 1st-layer calculation result.

By the convolution algorithm, the image data IMG originally having twenty five pixel values is able to be simplified to have nine simplified values. In some embodiments, the content values of the feature core KR are able to be set according to practice needs (for example, characteristics of the image data IMG or purposes of following processes). Thus, important information is able to be extracted.

In some embodiments, each CNN is corresponding to a plurality of feature cores. Under this condition, the processor 122 simultaneously utilizes the feature cores to simplify the image data IMG, in order to generate a plurality of 1st-layer calculation results.

In step S208, the processor 122 determines whether a threshold time is reached or not. In some embodiments, the threshold time may be set or adjusted according to practice needs. For example, the threshold time is set according to calculation resources of the processor 122.

In some embodiments, if the threshold time is not reached yet, step S210 is entered. In step S210, the processor 122 determines whether M is equal to N or not. If not, step S206 is entered again. In other words, the processor 122 performs the convolution algorithm to the Mth-layer calculation result to generate a next layer (for example, (M+1)th-layer) calculation result and updates M to be as (M+1) until the threshold time is reached or a Nth-layer calculation result is generated. Since generation methods of calculation results of other layers are similar with generation method of the 1st-layer calculation result, they are not described herein. In other words, the processor 122 utilizes an iterative method to calculate the calculation results.

In some embodiments, if the threshold time is determined to be reached in step S208, step S212 is entered. If the processor 122 generates the Mth-layer calculation result when the threshold time is reached, the image capturing device 120, in step S212, regards the Mth-layer calculation result as the feature information FI, and transmits the feature information FI to the server 140 through the communication link L1. Then, step S214 is entered.

The image capturing device 120, in step S212, transmits the feature information FI (for example, the Mth-layer calculation result) to the server 140. Thus, it may prevent from transmitting the image data IMG, in order to prevent from leaking the image data IMG out.

In step S214, the processor 142 performs the convolution algorithm to the Mth-layer calculation result. In some embodiments, the image capturing device 120 and the server 140 adopt the same CNN. In some embodiments, the processor 142 fills the Mth-layer calculation result into a Mth layer, and then performs the convolution algorithm to the Mth-layer calculation result, in order to generate a (M+1)th layer calculation result. In some embodiments, the (M+1)th layer calculation result is regarded as a Kth-layer calculation result. K is a positive integer, K is greater than M, and K is less than or equal to N. In some embodiments, the calculation results are recorded in a form of binary large object (Blob). In other words, the calculation results are regarded as Blob data. Each of the Blob data has a corresponding Blob ID. Thus, the processor 122 or 142 is able to determine, through the Blob ID of a calculation result, which one of the layers the calculation result belongs to. The calculation result is then filled into a corresponding layer. Then, the processor 122 or 142 is able to perform the convolution algorithm to the calculation result to generate a next layer calculation result. In some embodiments the processor 122 or 142 determines, through a structure of the calculation result, which one of the CNNs generates the calculation result. In some embodiments, the processor 122 or 142 determines, through the structure of the calculation result, which one of the layers the calculation result belongs to. For example, if the structure of the calculation result is 6×6×256, the processor 122 or 142 determines that the calculation result is generated by AlexNet, which is a CNN.

In step S216, the processor 142 determines whether K is equal to N or not. If not, step S214 is entered again. In other words, the processor 142 performs the convolution algorithm to the Kth-layer calculation result to generate a next layer calculation result (for example, a (K+1)th-layer calculation result) and updates K to be as (K+1) until the Nth-layer calculation result is generated. Then, step S218 is entered. In other words, when K is less than N, the processor 142 performs algorithm by the iterative method until the Nth-layer calculation result is generated.

In step S218, the processor 146 generates a recognition result based on the Nth-layer calculation result and one of the recognition model MD1 and the recognition model MD2, in order to recognize the image data IMG. In some embodiments, the Nth-layer calculation result is regarded as shared feature information. In some embodiments, the shared feature information is stored in the memory 144.

In some embodiments, the processor 146 inputs the Nth-layer calculation result into the recognition model MD1, in order to generate a first recognition result (for example, an image classification result) associated with the image data IMG. For example, if the image data IMG includes an animal (for example, a dog), the recognition model MD1 classifies the image data IMG into an animal classification according to the Nth-layer calculation result.

In some embodiments, the processor 146 inputs the Nth-layer calculation result into the recognition model MD2, in order to generate a second recognition result (for example, an object recognition result) associated with the image data IMG. For example, if the image data IMG includes the animal (for example, the dog), the recognition model MD2 detects a position of the animal in the image data IMG.

In some embodiments, the processor 146 inputs the first recognition result generated by the recognition model MD1 into the recognition model MD2, in order to generate a second recognition result associated with the image data IMG. In other words, the recognition model MD1 and the recognition model MD2 form a multi-task network cascade structure.

Returning to step S210, if the processor 122 determines that the Nth-layer calculation result is generated, step S220 is entered. In step S220, the processor 122 regards the Nth-layer calculation result as the feature information FI and transmits the Nth-layer calculation result to the server 140. In some embodiments, the Nth-layer calculation result is regarded as the shared feature information and transmitted to the server 140 through the communication link L1, in order to be stored in the memory 144. Then, step S218 is entered. The operations of step S218 are described in paragraphs above, so they are not described herein again.

The image capturing device 120 transmits the feature information FI (for example, the Nth-layer calculation result) to the server 140 in step S220. Thus, it may prevent from transmitting the image data IMG, in order to prevent from leaking the image data IMG out.

The above description of the recognition method 200 includes exemplary steps, but the steps of the recognition method 200 are not necessarily performed in the order described. The order of the steps of the recognition method 200 disclosed in the present disclosure are able to be changed, or the operations are able to be executed simultaneously or partially simultaneously as appropriate, in accordance with the spirit and scope of various embodiments of the present disclosure. For example, step S202 may be omitted when the image capturing device 120 and the server 140 are predetermined to utilize the same CNN.

In some embodiments, compared to other feature extracting algorithms which only extract some specific pixel values of the image data IMG, the convolution algorithm considers all pixel values of the image data IMG. Thus, the calculation results generated by the convolution algorithm have a larger adaptability. In other words, the calculation results generated by the convolution algorithm may be applied to various recognition models.

Compared to approaches in which a server generates all of the 1st-layer calculation result to the Nth-layer calculation result, in some embodiments, the image capturing device 120 at least generates the 1st-layer calculation result, such that cost for calculating of the server 140 may be reduced.

In some embodiments, the number of layers of the convolution algorithm of the image capturing device 120 or the number of layers of the convolution algorithm of the server 140 depends on a threshold time. In some embodiments, the threshold time may be dynamically adjusted according to calculation resources of the image capturing device 120 and/or calculation resources of the server 140. Thus, the recognition system 100 has adjustability.

In some embodiments, the recognition method 200 may be implemented as computer codes and stored in one or more storage devices. The storage devices include non-transitory computer readable storage medium or various devices having storing function. The computer codes include a plurality of code commands. The code commands may be performed by one or more processors.

In some embodiments, the Mth-layer calculation result or the Kth-layer calculation result may be a convolution result, a pooling result, an activation result, or a deconvolution result. Various calculation results of CNNs are within the contemplated scope of the present disclosure.

In some embodiments, calculation results of some layers are generated by different algorithms. For example, a 1st-layer calculation result is a convolution result, a 2nd-layer calculation result is a pooling result which is generated by performing the pooling algorithm to the 1st-layer calculation result (convolution result), a 3rd-layer calculation result is an activation result which is generated by performing the activation algorithm to the 2nd-layer calculation result (pooling result), a 4th-layer calculation result is a convolution result which is generated by performing the convolution algorithm to the 3rd-layer calculation result (activation result), a 5th-layer calculation result is a pooling result which is generated by performing the pooling algorithm to the 4th-layer calculation result (convolution result), a 6th-layer calculation result is an activation result which is generated by performing the activation algorithm to the 5th-layer calculation result (pooling result), and so on.

Figure 4:
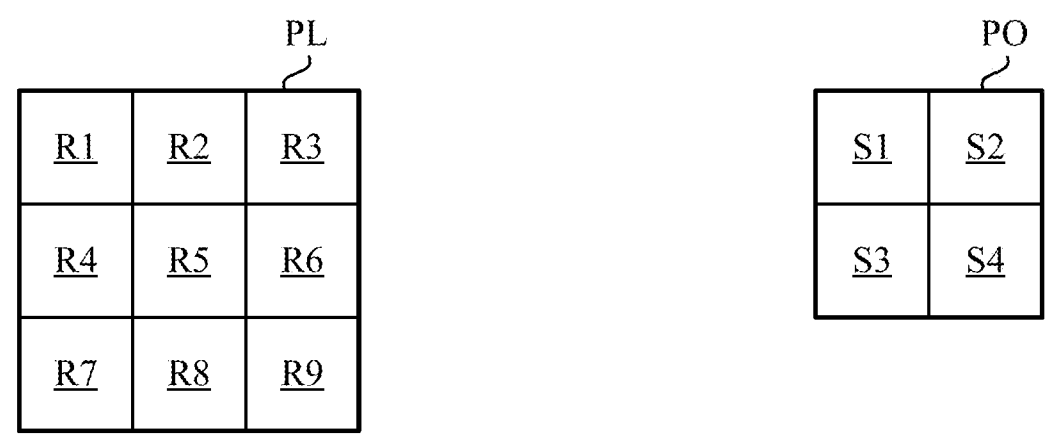

Reference is now made to FIG. 4. FIG. 4 is a schematic diagram illustrating a pooling algorithm according to some embodiments of the present disclosure.

As illustratively shown in FIG. 4, a convolution result PL (for example, the 1st-layer convolution result) includes nine content values. The content values include the content value R1-R9. A square matrix PO is configured to simplify the convolution result PL to generate a pooling result. As illustratively shown in FIG. 4, the square matrix PO includes four content values. The content values include the content values S1-S4.

The pooling algorithm is described in following paragraphs. At first, the content values S1-S4 of the square matrix PO respectively correspond to the content values R1, R2, R4, and R5 of the convolution result PL. A maximum value of the content values R1, R2, R4, and R5 may be selected to be as a first simplified value. Then, the square matrix PO is entirely moved rightwards by one grid, such that the content value S1-S4 of the square matrix PO respectively correspond to the content values R2, R3, R5, and R6 of the convolution result PL. A maximum value of the content values R2, R3, R5, and R6 may be selected to be as a second simplified value. Then, the square matrix PO is moved downwards by one grid and moved to the leftmost, such that the content values S1-S4 of the square matrix PO respectively correspond to the content values R4, R5, R7, and R8 of the convolution result PL. A maximum value of the content values R4, R5, R7, and R8 may be selected to be as a third simplified value. Then, the square matrix PO is moved rightwards by one grid, such that the content values S1-S4 of the square matrix PO respectively correspond to the content values R5, R6, R8, and R9 of the convolution result PL. A maximum value of the content values R5, R6, R8, and R9 may be selected to be as a fourth simplified value. Accordingly, four simplified values are finally obtained. The four simplified values are arranged as a square matrix (for example, a 1st-layer pooling result), a shape of the square matrix is a four-square-grid. In some embodiments, a Mth-layer pooling result or a Kth-layer pooling result is regarded as the Mth-layer calculation result or the Kth-layer calculation result. For example, the 1st-layer pooling result is regarded as the 1st-layer calculation result.

By the pooling algorithm, the convolution result PL originally having nine content values is able to be simplified to have four simplified values. Thus, important information is able to be further extracted.

The implementations of the pooling algorithm are given for illustrative purposes only. Various implementations of the pooling algorithm are within the contemplated scope of the present disclosure. For example, in some embodiments, the pooling algorithm may generate the simplified values by selecting an average value, a minimum value, or a median value.

As the above embodiments, in the recognition system and the recognition method of the present disclosure, the image capturing device transmits the feature information instead of the image data to the server. Thus, the image data is prevented from being leaked out during a transmission.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of the present disclosure provided they fall within the scope of the following claims.

What is claimed is:

1. A recognition system, comprising:
   an image capturing device configured to generate a Mth-layer calculation result based on image data and a convolutional neural network (CNN), and configured to transmit feature information associated with the Mth-layer calculation result, wherein M is a positive integer, M is equal to or greater than 1, M is less than or equal to N, and N is a predetermined positive integer; and
   a server coupled to the image capturing device and configured to receive the feature information, wherein the server generates a Kth-layer calculation result based on the feature information and the CNN by an iterative method when M is less than N, wherein K is a positive integer which is greater than M and less than or equal to N, and the server generates a first recognition result associated with the image data based on the Kth-layer calculation result and a first recognition model when K is equal to N, in order to recognize the image data.

2. The recognition system of claim 1, wherein when M is equal to N, the Mth-layer calculation result is configured to be as the feature information and the server generates the first recognition result based on the feature information and the first recognition model.

3. The recognition system of claim 1, wherein the server is further configured to generate a second recognition result associated with the image data based on the first recognition result and a second recognition model, and the second recognition model is different from the first recognition model.

4. The recognition system of claim 1, wherein the Mth-layer calculation result comprises a convolution result, a pooling result, an activation result, or a deconvolution result.

5. The recognition system of claim 1, wherein the image capturing device is further configured to determine whether a threshold time is reached or not, the image capturing device transmits the Mth-layer calculation result to the server to be as the feature information when M is less than N and the threshold time is reached, and the image capturing device performs an iterative calculation based on the Mth-layer calculation result and the CNN when M is less than N and the threshold time is not reached.

6. A recognition method, comprising:
   by an image capturing device, generating a Mth-layer calculation result based on image data and a convolutional neural network (CNN);
   by the image capturing device, transmitting feature information associated with the Mth-layer calculation result to a server, wherein M is a positive integer, M is equal to or greater than 1, M is less than or equal to N, and N is a predetermined positive integer;
   by the server, generating a Kth-layer calculation result based on the feature information and the CNN by an iterative method when M is less than N, wherein K is a positive integer which is greater than M and less than or equal to N; and
   by the server, generating a first recognition result associated with the image data based on the Kth-layer calculation result and a first recognition model when K is equal to N, in order to recognize the image data.

7. The recognition method of claim 6, wherein when M is equal to N, the Mth-layer calculation result is configured to be as the feature information and the recognition method further comprises:
   by the server, generating the first recognition result based on the feature information and the first recognition model when M is equal to N.

8. The recognition method of claim 6, further comprising:
   by the server, generating a second recognition result associated with the image data based on the first recognition result and a second recognition model,
   wherein the second recognition model is different from the first recognition model.

9. The recognition method of claim 6, wherein the Mth-layer calculation result comprises a convolution result, a pooling result, an activation result, or a deconvolution result.

10. The recognition method of claim 6, further comprising:
    by the image capturing device, determining whether a threshold time is reached or not;
    by the image capturing device, transmitting the Mth-layer calculation result to the server to be as the feature information when M is less than N and the threshold time is reached; and
    by the image capturing device, performing an iterative calculation based on the Mth-layer calculation result and the CNN when M is less than N and the threshold time is not reached.

11. A non-transitory computer readable storage medium storing a computer program, wherein the computer program is configured to execute a recognition method, and the recognition method comprises:
    generating a Mth-layer calculation result based on image data and a convolutional neural network (CNN);
    transmitting feature information associated with the Mth-layer calculation result, wherein M is a positive integer, M is equal to or greater than 1, M is less than or equal to N, and N is a predetermined positive integer;
    generating a Kth-layer calculation result based on the feature information and the CNN by an iterative method when M is less than N, wherein K is a positive integer which is greater than M and less than or equal to N; and
    generating a first recognition result associated with the image data based on the Kth-layer calculation result and a first recognition model when K is equal to N, in order to recognize the image data.

* * * * *